(12) United States Patent
Berglund et al.

(10) Patent No.: US 11,390,834 B2
(45) Date of Patent: Jul. 19, 2022

(54) REACTIVE DISTILLATION IN BEVERAGE SPIRIT PRODUCTION

(71) Applicant: BOARD OF TRUSTEES OF MICHIGAN STATE UNIVERSITY, East Lansing, MI (US)

(72) Inventors: Kris A. Berglund, Okemos, MI (US); Jacob Rochte, Turlock, CA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 711 days.

(21) Appl. No.: 16/361,677

(22) Filed: Mar. 22, 2019

(65) Prior Publication Data

US 2019/0292501 A1    Sep. 26, 2019

Related U.S. Application Data

(60) Provisional application No. 62/647,237, filed on Mar. 23, 2018.

(51) Int. Cl.
*C12G 3/08* (2006.01)
*C12G 3/02* (2019.01)

(52) U.S. Cl.
CPC    *C12G 3/08* (2013.01); *C12G 3/02* (2013.01)

(58) Field of Classification Search
CPC ... C12G 3/08; C12G 3/02; C12H 6/02; B01D 3/001

USPC ......................................................... 426/592
See application file for complete search history.

(56) References Cited

U.S. PATENT DOCUMENTS 2,096,334 A * 10/1937 Merriam ................. C12H 6/02
426/387
2,879,165 A * 3/1959 Hendel ................... B01D 3/003
203/42

* cited by examiner

*Primary Examiner* — Vera Stulii
(74) *Attorney, Agent, or Firm* — Marshall, Gerstein & Borun LLP (57) ABSTRACT

The disclosure relates to a reactive distillation method for beverage spirit production, the method comprising. An initial reaction mixture includes water, ethanol, and a carboxylic acid, for example having 3 or more carbon atoms. The reaction mixture is reactively distilled in the presence of an esterification catalyst to react a portion of the ethanol and the carboxylic acid to form an ethyl carboxylate reaction product, and form a distillation product or distillate including water, ethanol, and the ethyl carboxylate. The esterification catalyst is not present in the distillation product, for example when using a solid acid esterification catalyst in the reaction mixture. In a refinement, ethanol and the carboxylic acid can be co-fermented in an initial grain mixture, which is subsequently reactively distilled according to the disclosed method.

16 Claims, 3 Drawing Sheets

REACTIVE DISTILLATION IN BEVERAGE SPIRIT PRODUCTION

CROSS REFERENCE TO RELATED APPLICATION

Priority is claimed to U.S. Provisional Application No. 62/647,237, filed Mar. 23, 2018, and the disclosure thereof is hereby incorporated by reference in its entirety.

STATEMENT OF GOVERNMENT INTEREST

None.

BACKGROUND OF THE DISCLOSURE

Field of the Disclosure

The disclosure relates to a reactive distillation method for beverage spirit production. An additional carboxylic acid is added to a fermentation product reaction mixture along with an esterification catalyst to distill and react the carboxylic acid with ethanol in the reaction mixture to form a corresponding ethyl carboxylate flavor component in the final beverage spirit product.

SUMMARY

In an aspect, the disclosure relates to a method for beverage spirit production, the method comprising: providing a reaction mixture comprising water, ethanol, and a carboxylic acid (e.g., having 3 or more carbon atoms); reactively distilling the reaction mixture in the presence of an esterification catalyst to (i) react a portion of the ethanol (e.g., a minor portion of the starting ethanol) and the carboxylic acid to form an ethyl carboxylate reaction product, and (ii) form a distillation product (e.g., the distillate) comprising water, ethanol, and the ethyl carboxylate; wherein: the distillation product has a water concentration less than that of the reaction mixture; and the distillation product has an ethanol concentration greater than that of the reaction mixture. The esterification catalyst is not present in the distillation product.

The carboxylic acid reactive with ethanol to form the corresponding ethyl ester flavor component preferably has 3 or more carbon atoms, for example to prevent formation of (additional) ethyl acetate, such as ethyl acetate that could be formed in addition to a natural amount formed based on levels of acetic acid possibly present as fermentation byproduct in addition to ethanol. Further, cuts of beverage spirit distillate can be selected to eliminate or reduce ethyl acetate from the beverage spirit product (e.g., by appropriate selection of head vs. heart cuts or fractions). In various embodiments, the carboxylic acid can have at least 3 or 4 carbon atom and/or up to 5, 6, 8, or 10 carbon atoms, for example 3 to 6, 6 to 10, or 3 to 10 carbon atoms.

In various refinements, the carboxylic acid can be an aliphatic (alkyl) carboxylic acid. More generally, the carboxylic acid can include saturated, unsaturated, and/or aromatic hydrocarbon portions in addition to its carboxylic acid (—COOH) functional group(s). In other refinements the carboxylic acid can include linear or branched alkyl carboxylic acid (e.g., where butyric acid is representative), cycloalkyl carboxylic acid, or aromatic carboxylic acid (e.g., where vanillic acid or cinnamic acid is representative). Alternatively or additionally, the carboxylic acid can be a monoacid (e.g., an aliphatic (alkyl) monocarboxylic acid), a diacid (e.g., succinic acid), a triacid (e.g., citric acid), or more to form a corresponding monoester diester, triester, etc. In some embodiments, a single carboxylic acid species is added to the reactive distillation mixture to form a single corresponding ethyl ester as a flavor component. In other embodiments, multiple carboxylic acid species are added to the reactive distillation mixture to form a multiple corresponding ethyl esters as flavor components, for example based on a plurality of different carboxylic acid species having the same or different number of carbon atoms, the same or different number of carboxylic acid functional groups, etc. In addition to its hydrocarbon component and carboxylic acid functional group(s), the carboxylic acid can include other functional groups such as hydroxy groups (e.g., such as in citric acid, vanillic acid) and/or native ester groups (e.g., present before reactive distillation; such as methyl ester groups in vanillic acid or other acids).

In a particular refinement, the carboxylic acid is selected from the group consisting of propanoic acid (or propionic acid), butanoic acid (or butyric acid), pentanoic acid, hexanoic acid, citric acid, vanillic acid, and combinations thereof. For instance as illustrated in the examples, the carboxylic acid can include butanoic acid/butyric acid. Other suitable carboxylic acids capable of forming corresponding ester aroma and/or flavor components include formic acid, acetic acid, 2-methyl propanoic acid, benzoic acid, heptanoic acid, salicylic acid, octanoic acid, phenyl acetic acid, nonanoic acid, cinnamic acid, and decanoic acid. In addition to forming ester aroma and/or flavor components from ethanol in the reactive distillation system, any of the foregoing carboxylic acids can form suitable ester products from other alcohols such as methanol, propanol, 2-methyl propanol, butanol, hexanol, heptanol, octanol, nonanol, and benzyl alcohol (e.g., the 1-hydroxy forms thereof). Such additional alcohols can be separately added to the reaction mixture, or they could be additional fermentation (by) products, whether from a primary ethanol-producing microorganism or from a secondary co-fermentation microorganism.

In a particular refinement, the carboxylic acid is characterized as having a binary azeotrope with water; a ternary mixture of the carboxylic acid, water, and ethanol is characterized by a separatrix defining a co-distillation region of concentration values in which the carboxylic acid is preferentially distilled with ethanol; and the reaction mixture (initially) has concentration values for water, ethanol, and the carboxylic acid which are in the co-distillation region. In the ternary mixture, water is preferentially recovered (alone) in the bottoms of a distillation process and carboxylic acid/ethanol are together preferentially recovered in the distillate, for example with only minor amounts of the components in the non-preferential distillation streams. The ternary mixture can be further characterized by a concentration region outside the co-distillation region where water/ethanol are preferentially recovered in one stream and the carboxylic acid is preferentially recovered (alone) the other stream. Typical reaction mixtures for beverage spirits will contain more than three (i.e., water, ethanol, and the carboxylic acid) components, but the foregoing reference to a binary azeotrope between water and the carboxylic acid and a ternary mixture of water, ethanol, and the carboxylic acid reflect the properties of the water, ethanol, and carboxylic acid components in combination with each other and other fermentation components. Specifically, the initial reaction mixture component concentrations for water, ethanol, and the carboxylic acid can be selected for the preferential separation between water and ethanol/carboxylic acid even with the other fermentation components in the reaction mixture. In this particular refinement, the ethanol/carboxylic acid mixture is relatively more volatile than water.

In other refinements, the carboxylic acid need not be characterized as having a binary azeotrope with water. The disclosed method is generally applicable to any system in which the ethanol and carboxylic acid together contact the solid acid catalyst and can be converted to the corresponding ethyl ester.

In a refinement, the carboxylic acid has a boiling point above that of water. For example the boiling point of the carboxylic acid can range from at least 100, 110, 120, 140, or 160° C. and/or up to 120, 140, 160, 180, or 200° C. Representative boiling point values for carboxylic acids of interest are 141° C. (propionic acid), 163° C. (butanoic/butyric acid), and 187° C. (pentanoic acid). The foregoing boiling points can be applicable to carboxylic acids which exhibit azeotropic behavior with water and those which do not.

In a refinement, the reaction mixture comprises a low wine spirit. The low wine spirit can have an ethanol concentration in a range of at least 5, 10, or 15% and/or up to 30, 35, or 40% ABV. The low wine spirit is generally derived from a mash distillate, for example a stripping product thereof.

In a refinement, the reaction mixture has an initial concentration for the carboxylic acid in a range from 0.001 wt. % to 2 wt. %, For example, the initial concentration for the carboxylic acid can be at least 0.001, 0.01, 0.02, 0.05, 0.1, 0.2, or 0.5 wt. % and/or up to 0.1, 0.2, 0.5, 1, 1.5, or 2 wt. %. Alternatively or additionally, the distillation product can have a concentration for the ethyl carboxylate up to 2 wt. %. For example, the final concentration for the ethyl carboxylate can be at least 0.000001, 0.00001, 0.0001, 0.001, 0.01, 0.02, 0.05, or 0.1 wt. % and/or up to 0.001, 0.01, 0.02, 0.05, 0.1, 0.2, 0.5, 1, 1.5, or 2 wt. %. The foregoing concentration can apply to a single carboxylic acid and ethyl carboxylate, or to a plurality of carboxylic acids and ethyl carboxylates, such as when the reaction mixture includes a plurality of added carboxylic acids for forming a distribution of ethyl ester flavor components.

In a refinement, the reaction mixture has an initial concentration for ethanol in a range from 5 wt. % to 40 wt. %. For example, the reaction mixture can have an initial ethanol concentration at least 5, 10, 15, 20, or 25 wt. % and/or up to 20, 25, 30, 35, or 40 wt. %. Alternatively or additionally, the distillation product can have a concentration for ethanol of at least 30 wt. %. For example, the final concentration for the ethanol can be at least 30, 35, 40, 50, or 60 wt. % and/or up to 50, 60, 70, 80, 90, or 95 wt. %. Alternatively or additionally, the distillation product can have a concentration for ethanol of at least 40% ABV (e.g., at least 40, 50, or 60% ABV).

In a refinement, the reaction mixture comprises one or more byproducts (e.g., distillation or fermentation byproducts) selected from the group consisting of acetone, acetic acid, methanol, n-propanol, n-butanol, isoamyl alcohol, and combinations thereof. Such additional components can be individually present at levels up to about 0.01 wt. %, for example from about 0.000001, 0.00001, or 0.0001 wt. % to 0.01 wt. %, In some embodiments, corresponding byproduct esters such as methyl butyrate, propyl butyrate, butyl butyrate etc. could be formed and retained in the final distillate product, which can impart an additional flavor profile to the final beverage spirit.

In a refinement, the esterification catalyst comprises a solid acid catalyst. The use of the solid catalyst avoids contamination of the liquid beverage spirit product and does not create an additional need to separate the solid acid catalyst from the product (e.g., because it remained in the distillation apparatus). Any solid, food-grade acid can be used, for example including a solid ion-exchange resin with an acidic group (e.g., sulfonic acid group), such as in the AMBERLYST catalysts used in the examples.

In a refinement, the method further comprises: co-fermenting ethanol and the carboxylic acid in a grain mixture to form a fermented grain mixture comprising ethanol and the carboxylic acid (e.g., aqueous mixture including a grain carbohydrate source, such as a mash mixture); and performing one or more separation processes (e.g., distillation) on fermented grain mixture to form the reaction mixture. In a typical beverage spirit process, a fermented grain mixture or mash is used as the reaction mixture input to the reactive distillation process according to the disclosure. The first distillation of the mash fermentation product is generally called a stripping run, and its product is generally referred to as a low wine (e.g., including 20-40% ABV). The first distillation or stripping run is generally a conventional distillation step, for example including separation but no significant reaction or presence of catalyst, even if carboxylic acid is present in the fermentation product. The second and any subsequent distillation steps are typically called finishing runs. Finishing usually yields the final product used as a beverage, although the product may be distilled as many times as desired to achieve a desired quality. In the methods according to the disclosure, one or more of the finishing distillation runs can be performed in the presence of an esterification catalyst and the carboxylic acid (e.g., as a co-fermentation product or a separately added reactant) to provide the ethyl carboxylate product in the final beverage spirit.

In a further refinement, the grain mixture comprises *Clostridium tyrobutyricum* as a fermentation microorganism producing butyric acid as the carboxylic acid having 3 or more carbon atoms. The grain mixture can generally include two microorganisms: *Saccharomyces cerivisiae* for ethanol fermentation and a second microorganism for the carboxylic acid fermentation (e.g., *Clostridium tyrobutyricum* or otherwise). Various other *Saccharomyces* species such as *Saccharomyces pastorianus* are examples of other suitable microorganisms for ethanol fermentation. Various other *Clostridium* species such as *Clostridium acetobutricum* are examples of other suitable fermentation microorganisms for carboxylic acid and/or other fermentation products. Alternatively or additionally, genetically modified microorganisms can be engineered according to general skill in the art to form desired carboxylic acids as their fermentation products. In such cases, as with the used of non-genetically modified microorganisms, the microorganisms are not present in the final beverage spirit (e.g., having been removed from the fermented grain mixture prior to reactive distillation).

In an embodiment the reactive distillation product is itself or is a component of a beverage spirit selected from the group consisting of vodka, gin, rum, brandy, and whisky. In some cases, the reactive distillation product can be further barrel aged prior to being distributed for consumption as a spirit.

While the disclosed apparatus, compounds, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The disclosure relates to the creation of new flavors in situ during distillation of spirits. As an example, butyric acid can be added to the distillation system, for instance as a separate feed to a fermented spirit, prior to the final spirit distillation along with ion-exchange catalyst. The butyric acid could also be created by a parallel fermentation in situ with ethanol formation via fermentation (e.g., with separate microorganisms for each of butyric acid and ethanol). The butyric acid reacts with the ethanol during distillation to create ethyl butyrate in a (final) reactive distillation of the beverage spirit. The resulting product therefore has an additional flavor due to the smell and taste of the ethyl butyrate. For example, the ethyl butyrate can provide a spirit with a fruity smell and taste, similar to banana candy or bubble gum.

The examples below provide further description related to the disclosure.

Example 1 is a representative reactive distillation process using a low wine alcohol feedstock with added butyric acid reactant and a solid acid catalyst to form ethyl butyrate in the beverage spirit product. A middle hearts cut of the distillate results after elimination of (i) an early heads cut or distillate portion with undesirable distillation components (e.g., ethyl acetate) and (ii) a late tails cut or distillate portion with undesirable distillation components (e.g., unreacted butyric acid or other carboxylic acids) during collection of the distillate. A sensory evaluation of the beverage spirit product indicated that the product had the smell of ethanol and fruity bubble gum.

Example 2 is a more detailed illustration and description of a reactive distillation method according to the disclosure, also forming ethyl butyrate in the beverage spirit product. In particular, distilled alcoholic beverages have been produced through fermentation and distillation for centuries but have not purposefully involved a chemical reaction to produce a flavoring. Introducing a microorganism to produce butyric acid along with the typical yeast ethanol fermentation sets up a reactive distillation system to flavor a spirit with ethyl butyrate and butyric acid. The ternary interactions of water, ethanol, and butyric acid allow all three to vaporize in the stripping distillation, thus they are concentrated in the low wines and give a large excess of ethanol compared to butyric acid for better reaction completion. The stripping distillation has also been modeled on ASPEN PLUS software and coincides well with a test stripping distillation at the bench scale. AMBERLYST 15 wet catalyst (a solid acid catalyst) was added to a subsequent distillation, resulting in the production of the desired ethyl butyrate in the distillate, measured by gas chromatography. Primary sensory evaluation has determined that this process has a profound effect on the smell of the spirit with the main flavor being similar to fruity bubble gum. The illustrated method provides a pathway for creating spirits with a desired flavor on demand without acquiring a heavy capital cost if a beverage distillation column is already purchased.

In-Situ Esterification of Alcoholic Beverages

The basic concept of fermentation and distillation to create an alcoholic beverage has remained largely unchanged since its inception, mainly due to tradition. Reactive distillation combines the two unit operations of a chemical reaction and a distillation into one. This technique is useful for reactions that need a special condition that can be achieved through distillation, such as a large excess of one of the reactants, or for removing a product to drive an equilibrium reaction to completion. Combining the two processes into one decreases time and energy to produce a desired result. Initial capital cost and maintenance costs are also lowered because the reactor and column is the same piece of equipment. Other than sulfur adsorption onto copper, the alcoholic beverage industry does not purposefully use this technique in the production of spirits. Introducing an esterification reaction step into the production of beverage spirits provides a food grade, flavored spirit while adhering to the standards of identity for distilled alcoholic beverages in the United States. Described herein are materials and apparatus that can be used to perform the disclosed reactive distillation process and create the corresponding beverage spirit.

Esters

An ester is formed when an acid and alkoxy group (e.g., from an alkylhydroxy compound) join together though a condensation reaction. It can be any acid and any alkoxy group, but it generally includes a condensation reaction product between an organic acid and an alcohol. This esterification is generally a slow reaction, and the reaction rate is suitably increased using an acid catalyst, for example using Fischer-Speier esterification with a sulfuric acid catalyst. Esters are commonly used in flavorings and fragrances because of their pleasant odor: Ethyl butyrate is commonly used because it has the smell of pineapples or fresh orange juice. Scheme 1 below shows the condensation of butyric add and ethanol to create ethyl butyrate. This reaction is illustrative of the disclosed reactive distillation reaction between ethanol and a more general carboxylic acid in place of the specifically illustrated butyric acid in Scheme 1.

Scheme 1

In an embodiment, the carboxylic acid can be added to ethanol and water prior to reactive distillation, for example where the ethanol and water are in the form of a mixture formed as products from a prior fermentation process. This is illustrated in Example 2, below, for a particular case in which food grade butyric add was added to a fermented mash before the first distillation. In other embodiments, the process can include a co-fermentation step to produce both ethanol and a carboxylic acid in the same initial fermentation process, which provides a product mixture including water, ethanol, and the carboxylic acid. This fermentation product mixture can then be uses as the reaction mixture in the disclosed reactive distillation process to form a beverage spirit including an ethyl carboxylate product. For example co-fermentation process using *Saccharomyces cerevisiae* and *Clostridium tyrobutyricum* can be used to produce ethanol and butyric acid, respectively, in the same fermentation product mixture.

Introduction of ester production in beverage spirit distillations can provide a series of beverage spirit products that have unique smells and tastes. These qualities provide the spirit with an increased value and marketability, thus mitigating the slight reduction in ethanol yield from the production of the organic acid in the fermentation and/or from ethanol consumption in the esterification process converting a small of the ethanol fermentation product to corresponding ethyl carboxylate. The disclosed process provides a pathway for creating spirits with a desired flavor on demand without requiring a large capital cost if a beverage distillation column is already purchased. Manufacturers are able to produce a uniquely flavored spirit by adding an appropriate esterification catalyst to the distillation column (thus using it as a reactive distillation column) and adding a desired carboxylic acid to the reactant mixture with ethanol and water. The carboxylic acid can be provided from any desired source, for example as a commodity chemical purchased and added to the reactant mixture or as a fermentation/co-fermentation product of an appropriate microorganism.

The reaction of ethanol and butyric acid or other carboxylic acid to ethyl butyrate or other ethyl carboxylate proceeds naturally. Without wishing to be bound by theory, the catalyst that is put into the column speeds the reaction rate and drives the reaction more toward the product, i.e. the catalyst is not adding a new reaction, only accelerating an already existing reaction.

Figure 1:
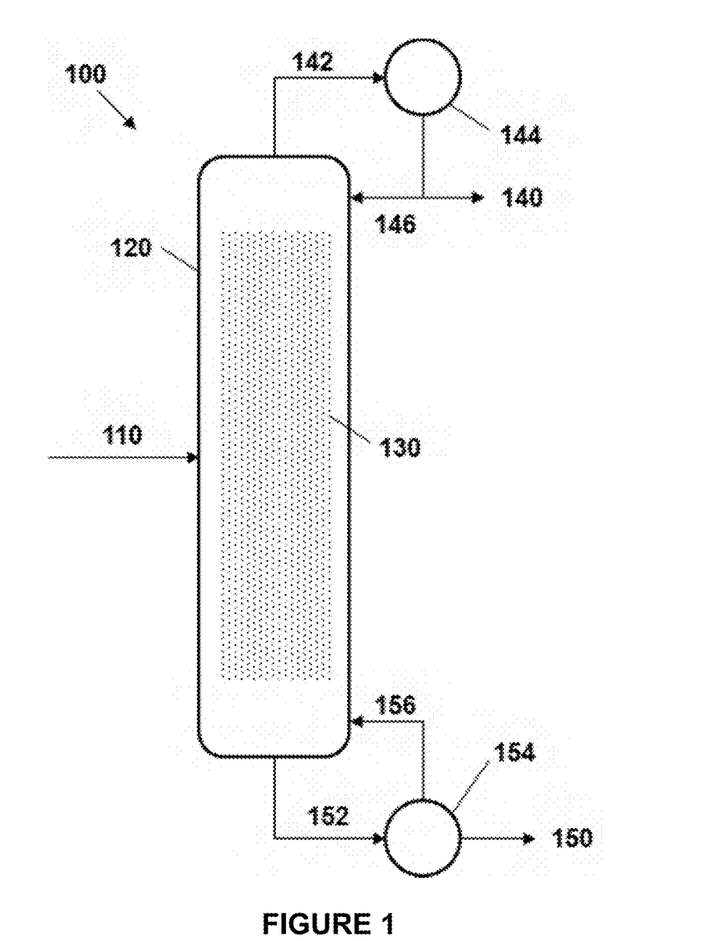
FIG. 1 illustrates a reaction system according the disclosure for reactive distillation of ethanol, water, and a carboxylic acid in the presence of an esterification catalyst.

FIG. 1 illustrates a suitable reaction system 100 for performing methods according to the disclosure for beverage spirit production. As illustrated in FIG. 1, a reaction mixture 110 is delivered to a reactive distillation vessel 120 such as a reactive distillation column 120. As illustrated, the reactive distillation can be performed as a continuous process in the column 120. In other embodiments, the reactive distillation can be performed as a batch process. The reaction mixture 100 includes water, ethanol, and a carboxylic acid, for example a carboxylic acid having 3 or more carbon atoms. The components of the reaction mixture 110 can be delivered or added to the reactive distillation vessel in any desired manner, for example in combination as a single feed stream (e.g., as illustrated in FIG. 1) or as multiple feed streams (e.g., one stream with water and ethanol and another stream with the carboxylic acid; not shown). The reaction vessel 120 can include an esterification catalyst 130 suspended, immobilized, packed, or otherwise contained therein, for example when the esterification catalyst 130 is a solid catalyst such as a solid acid catalyst. In some cases, the esterification catalyst 130 can be a solid ion-exchange resin with a sulfonic acid group (or other acid group), such as in the AMBERLYST catalysts used in the examples. In embodiments in which a non-solid catalyst 130 is used (e.g., an acid catalyst in liquid form), the catalyst 130 can be delivered to the reaction vessel 120 as a separate stream or in combination with one or more of the reaction mixture 110 components.

The particular concentrations of the reaction mixture 110 components are not particularly limited and can depend on or be selected based on the source of the components (e.g., as fermentation or co-fermentation products) as well as the desired level of ethyl carboxylate flavor component in the final beverage spirit product. The reaction mixture 110 suitably has an initial concentration (e.g., as fed to the reaction vessel 120 on a continuous basis or as originally charged to the vessel 120 on a batch basis) for ethanol in a range from 5 wt. % to 40 wt. %. For example, the reaction mixture 110 can represent a low wine spirit, which can have an ethanol concentration of at least 5, 10, or 15% and/or up to 30, 35, or 40% ABV (alcohol by volume). The low wine spirit is generally derived from a mash distillate, for example a stripping product thereof. The reaction mixture 110 suitably has an initial concentration for the carboxylic acid in a range from 0.001 wt. % to 2 wt. %, which range can correspond to each carboxylic acid individually or all carboxylic acids of interest collectively (e.g., those having 3 or more carbon atoms). In some embodiments, the carboxylic acid has 3 or more carbon atoms, for example including butanoic acid/butyric acid. Butyric acid and ethanol form an azeotrope, allowing them to be recovered separately from the water in a reaction mixture. In some embodiments, the reaction mixture 110 further includes one or more byproducts, for example as a result of upstream distillation and/or fermentation processes. Example byproducts include acetone, acetic acid, methanol, n-propanol, n-butanol, and isoamyl alcohol. Such additional components can be individually present at levels up to about 0.01 wt. %. The balance of the reaction mixture 110 is generally water.

The reaction mixture 110 is introduced into the reactive distillation vessel or column 120 so that the reaction mixture 110 can be reactively distilled in the presence of the esterification catalyst 130. The reactive distillation and esterification process within the vessel 120 reacts a portion of the ethanol and the carboxylic acid to form a corresponding ethyl carboxylate reaction product. The reactive distillation process further forms a distillation product 140 (e.g., the distillate) containing water, ethanol, and the ethyl carboxylate. The ethanol in the distillation product 140 represents the ethanol from the reaction mixture 110 that was not consumed for esterification and that was concentrated to provide the alcohol content of the final beverage spirit. Thus, the distillation product 140 has a water concentration less than that of the reaction mixture 110. Further, the distillation product 140 has an ethanol concentration greater than that of the reaction mixture 110. The esterification catalyst 130 suitably is not present in the distillation product 140, for example as a result of using a solid esterification catalyst 130 that remains in the reaction vessel 120.

As particularly illustrated in FIG. 1, the reaction system 100 and reactive distillation column 120 can include recycling of reaction mixture 110 components (e.g., carboxylic acid and ethanol), by withdrawing a distillation overhead stream 142 and passing the same though a condenser 144, after which a portion is returned/recycled to the column 120 as a reflux stream 146 and a portion is withdrawn as the distillation product 140. The illustrated reaction system 100 also provides for removal of a bottoms product 150 (e.g., water) by withdrawing a bottoms stream 152 and passing the same though a reboiler 154, after which a portion is returned/recycled to the column 120 as a vapor stream 156 and a portion is withdrawn as the bottoms product 150.

The particular concentrations of the distillation product 140 components are not particularly limited. The distillation product 140 suitably contains ethanol in an amount from 30 wt. % to 95 wt. % (e.g., expressed on a weight basis), and/or at least 40% ABV (e.g., expressed on a volume basis). The distillation product 140 suitably has a concentration for the ethyl carboxylate in a range from 0.000001 wt. % to 2 wt. %, which range can correspond to each ethyl carboxylate individually or all ethyl carboxylates of interest collectively. In some embodiments, the ethyl carboxylate includes ethyl butyrate. In some embodiments, the distillation product 140 further includes one or more byproduct esters of byproduct alcohols noted above. Example byproduct esters include one or more of methyl butyrate, propyl butyrate, and butyl butyrate in particular or methyl carboxylate, propyl carboxylate, and butyl carboxylate more generally. The byproduct esters can be retained in the final distillate product 140 (e.g., to impart an additional flavor profile to the final beverage spirit) or subsequently removed therefrom. Such additional byproduct esters or unreacted byproducts can be individually present at levels up to about 0.01 wt. %. The balance of the distillation product 140 is generally water. In some cases, the reactive distillation product 140 is used directly (e.g., as is) as a beverage spirit for consumption, or the product 140 can be added as a component to a beverage spirit for consumption. Example beverage spirits include vodka, gin, rum, brandy, and whisky. In some cases, the reactive distillation product 140 can be further barrel aged prior to being distributed for consumption as a spirit.

Figure 2:
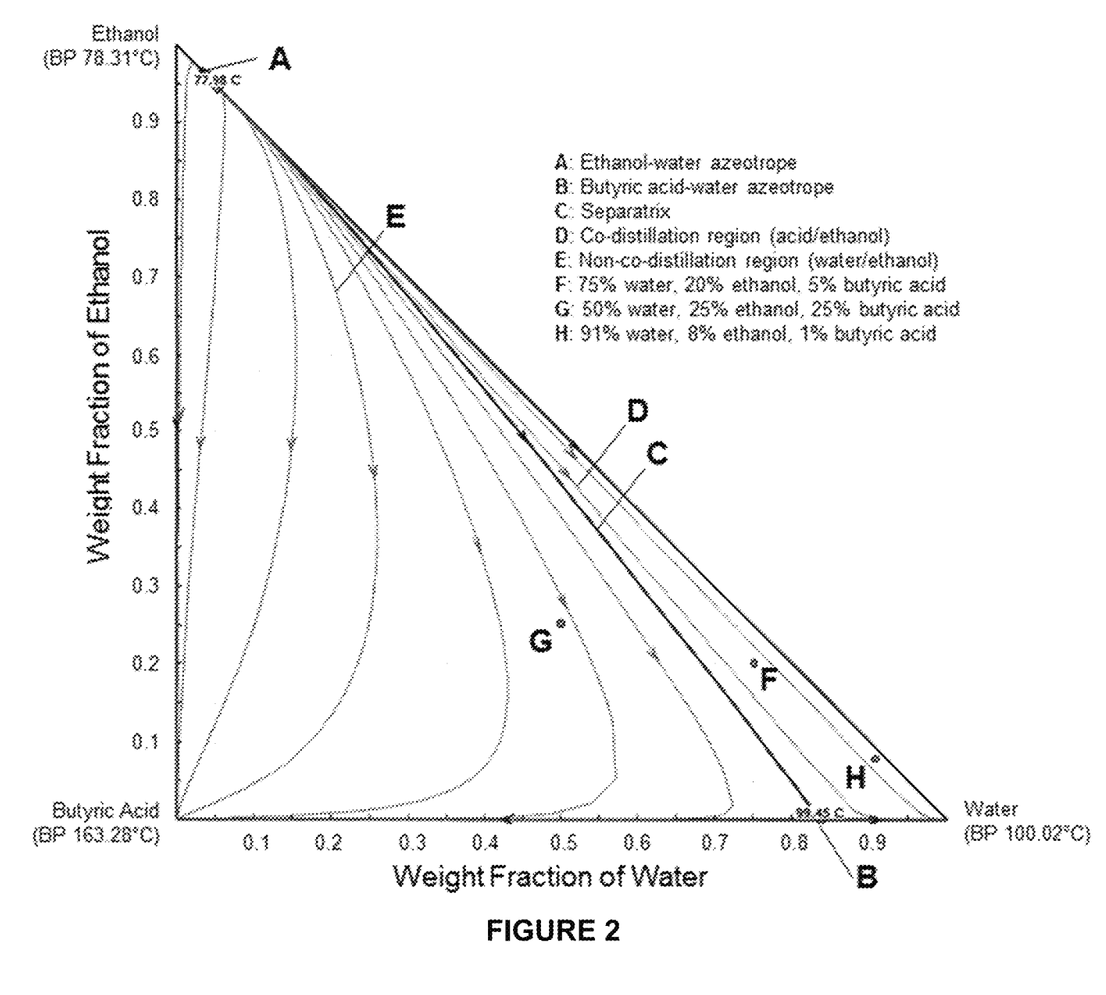
FIG. 2 shows a ternary residue curve map of water, ethanol, and butyric acid with separatrix C. The separatrix C starts at the ethanol/water azeotrope A and ends at the butyric acid/water azeotrope B. Residue curves are shown to either side of the separatrix C, with the arrows indicating the change in composition of the distillation bottoms as the reactive distillation process progresses. This diagram is measured in weight fraction.

FIG. 2 shows a ternary residue curve map (RCM) for water, ethanol, and butyric acid in weight fraction, which is representative of the reaction mixture 110. The RCM illustrates a binary ethanol/water azeotrope A which boils at about 78.0° C. and a binary water/butyric acid azeotrope B which boils at about 99.5° C. A separatrix C (or simple batch distillation boundary) is drawn between the two azeotropes A, B and it divides the RCM diagram into two distillation regions: a co-distillation region D (to the right of separatrix C) and a non-co-distillation region E (to the left of separatrix C). In the co-distillation region D, the butyric acid (or carboxylic acid more generally) is preferentially distilled in combination with ethanol as a distillation product 140, leaving water to concentrate in the distillation pot or as a bottoms product 150. In the non-co-distillation region E, water is preferentially distilled in combination with ethanol as a distillation product, leaving butyric acid (or carboxylic acid more generally) to concentrate in the distillation pot or as a bottoms product. Thus, in an embodiment, the reaction mixture 110 can be selected to have (initial) concentration values for water, ethanol, and the carboxylic acid which are in the co-distillation region D, thus keeping the ethanol and the carboxylic acid together during distillation and converting the two reactants to the ethyl carboxylate product. Residue curves in both regions D, E are drawn with arrows indicating component concentrations in the pot as a function of increasing temperature in the pot (or increasing distillation time) during a (reactive) distillation process.

The concentrations of water, ethanol, and butyric added in the pot at the beginning of a run (e.g., an initial reaction mixture 110 concentration in a batch process or a feed reaction mixture 110 concentration in a continuous process) determine the starting point on FIG. 2. The residue curves show the concentration of the components in the pot as the distillation proceeds. As an example, point F in FIG. 2 illustrates a mixture with concentrations of water, ethanol, and butyric acid of 75 wt. %, 20 wt. %, and 5 wt. %, respectively. Point F is to the right of the separatrix C and in the co-distillation region D, which means that ethanol and butyric acid are preferentially co-distilled with each other, leaving water behind such that the pot/bottoms concentration will be 100 wt. % water when the distillation is finished, with all of the ethanol and butyric acid from the system in the distillate (e.g., whether in alcohol, acid, or ester form). As a contrasting example, point G in FIG. 2 illustrates a mixture with concentrations of water, ethanol, and butyric acid of 50 wt. %, 25 wt. %, and 25 wt. %, respectively. Point G is to the left of the separatrix C and in the non-co-distillation region E, which means that ethanol and water are preferentially co-distilled with each other, leaving butyric acid behind such that the pot/bottoms concentration will be 100 wt. % butyric acid when the distillation is finished, with all of the ethanol and water from the system in the distillate.

The presence of the binary azeotropes A, B and corresponding separatrix C in this system allows the high-boiling butyric acid to be carried over in the distillate stream by the water during the first distillation of the spirit (e.g., if the butyric acid is co-fermented with ethanol in an initial step). This then sets up the system for a second reactive distillation over a catalyst to produce the desired ethyl butyrate in the finished spirit.

EXAMPLES

The following examples illustrate the disclosed methods and apparatus, but are not intended to limit the scope of any of the claims thereto.

Example 1: Small-Scale Esterification

A distillation apparatus was assembled, including a 500 mL round bottom boiling flask, a 36 cm Vigreux column, a 75° distillation adapter, and a 20 cm straight water cooled condenser. Six strips of 14 AWG copper wire (1.63 mm diameter) were put into the Vigreux column to simulate the copper in a beverage column.

To the boiling flask were added 15 mL low wine, 0.132 mL pure butyric acid, 5-10 boiling chips, and 15 g solid acid catalyst (AMBERLYST 15 wet) contained in a tightly sealed mesh bag. The mixture was distilled while collecting 0.5 mL samples of the distillate every time 5 mL were collected in the receiving container. To create a spirit for sensory evaluation, the distillate was collected starting after 5 mL was distilled, with collection ending after 35 mL of hearts were collected. These 35 mL were then proofed down to 40% ABV.

Each sample was analyzed on a gas chromatograph (GC). The ethanol and ethyl butyrate concentration curves have the same shape and are inverse of the butyric acid concentration curve. During the distillation, butyric acid was reacted with ethanol over the catalyst to form the desired ethyl butyrate. This ethyl butyrate product was then carried over in the distillate stream by the ethanol.

A sensory evaluation determined that this distillation has a profound effect on the smell of the final spirit product. The main smell in the product, other than ethanol, is fruity bubble gum.

Example 2: Lab-Scale Fractional Distillation

A distillation column was designed and simulated in ASPEN PLUS process simulation software to distill a whiskey mash with a requirement to have butyric acid present in the distillate of the column. The column was designed to have 17 bubble cap trays, stage seven as the feed stage and a reflux ratio of five. Table 1 below shows the operating conditions and stream compositions for the simulation. As shown in Table 1, the feed stream has concentrations of water, ethanol, and butyric acid of about 91 wt. %, 8 wt. %, and 1 wt. %, respectively, which is illustrated as point H on FIG. 2 and is in the co-distillation region D. The distillate stream of the column contains 94.7 mol. % of the butyric add in the system. This simulation shows that the main components will be present in the distillate of the stripping run. The low wines produced from this can then be distilled again using a catalyst to convert the butyric add into the desired ethyl butyrate.

TABLE 1

Distillation operating conditions and stream compositions

| Property | Feed | Distillate | Bottoms |
|---|---|---|---|
| Temperature (° C.) | 65 | 82.2 | 100 |
| Pressure (bar) | 1.01 | 1.01 | 1.01 |
| Vapor fraction | 0 | 0 | 0 |
| Mole flow (kmol/hr) | 76.83 | 8.71 | 68.12 |
| Water (kmol/hr) | 74.12 | 6.01 | 68.11 |
| Ethanol (kmol/hr) | 2.58 | 2.58 | Trace |
| Butyric acid (kmol/hr) | 0.133 | 0.126 | 0.007 |
| Mass flow (kg/hr) | 1465.8 | 238.2 | 1227.6 |
| Water (kg/hr) | 1334.2 | 108.2 | 1226.0 |
| Ethanol (kg/hr) | 118.5 | 118.5 | Trace |
| Butyric acid (kg/hr) | 11.7 | 11.1 | 0.62 |
| Volume flow (L/min) | 26.16 | 4.85 | 22.28 |
| Enthalpy (MMBtu/hr) | −20.60 | −2.32 | −18.08 |
| Mass fraction | | | |
| Water (wt. %) | 91.1 | 45.5 | 99.95 |
| Ethanol (wt. %) | 8.1 | 49.8 | — |
| Butyric acid (wt. %) | 0.8 | 4.7 | 0.05 |

A lab-scale fractional distillation was performed in conjunction with the ASPEN PLUS simulation to support the results. The experiment used a 500 mL round-bottom flask, Vigreux column, and a straight condenser setup in a fractional distillation configuration. The flask started with 250 mL of an aqueous solution containing 79.2 g/L ethanol and 4 g/L butyric acid. A final distillate of 70 mL was collected containing 230 g/L ethanol and 6.2 g/L butyric acid. This experiment coincides well with the ASPEN PLUS simulation described above.

Reactive Distillation

This experiment was performed on the bench scale. The mash was stripped 1 L at a time in a round-bottom flask. The flask was connected to a 36 cm Vigreux column, a 75° distillation adapter, and finally a 20 cm straight water cooled condenser. All connections are T24/40. Six strips of 14 AWG copper wire (1.63 mm diameter) were put into the Vigreux column to represent the copper in a beverage distillation column. For each stripping run, the distillate was collected until the ethanol fell below 10% ABV These low wines were then distilled a second time over AMBERLYST wet catalyst with varying loadings and positions within the column.

The low wine used for these experiments was obtained from Working Bugs LLC in East Lansing, Mich. This spirit had been stripped from a 100% corn mash distilled on a 17-tray continuous column. The bulk of the tank that this low wine was taken from was destined to be distilled again into a bourbon that will eventually be put into distribution, making this starting material as close as possible to what would be seen in industry. The low wine was measured as 30.45% ABV on an Anton Paar DMA 5000 M density meter.

The butyric acid (obtained from Agros Organics, 99+% purity) was added to the low wine up to the amount specified for each experiment. As described above, the butyric acid can alternatively be supplied as a co-fermentation product (e.g., using *Clostridium tyrobutyricum*), which acid will distill over into the low wine.

The AMBERLYST 15 wet catalyst was obtained from MilliporeSigma. This catalyst has a styrene-divinylbenzene matrix with strongly acidic sulfonic groups. It is a suitable replacement for the standard liquid sulfuric acid used in esterification. It can be used multiple times and does not contaminate the distilled spirit with a strong acid. The catalyst was supported in the distillation pot and column in a mesh pouch.

Figure 3:
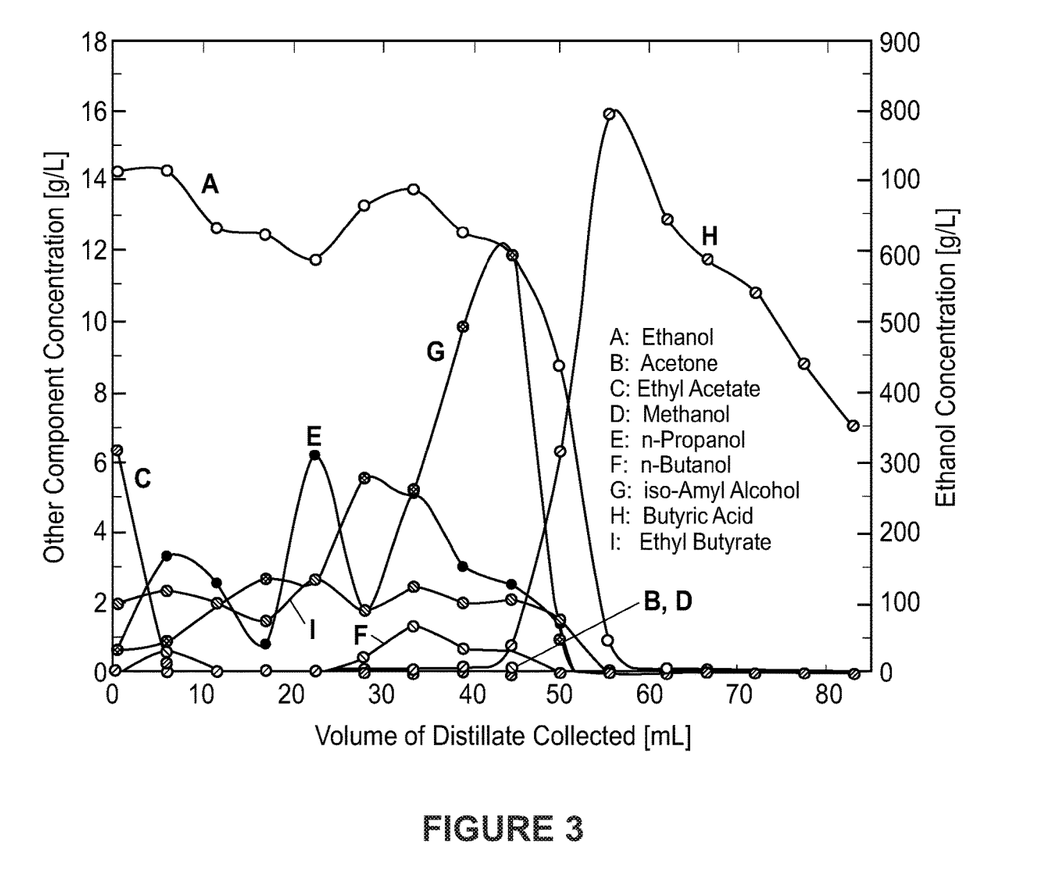
FIG. 3 shows the component concentrations in the distillate of a spirit run with 150 mL of low wines at 30% ABV, 4.0 g of butyric acid, and 15 g of AMBERLYST 15 wet solid acid catalyst in the distillation pot.

FIG. 3 shows component concentrations in a reactive spirit distillation as a function of distillate volume collected. The distillation consisted of 150 mL of low wine diluted to 30% ABV. Butyric acid was added to the pot to give a 4.0 g/L starting concentration and 15 g of AMBERLYST 15 wet catalyst was contained in a mesh bag and added to the pot during the distillation. No ethyl butyrate was added prior to the experiment. Table 2 summarized the component concentrations during reactive distillation.

TABLE 2

Concentration (g/L) of compounds of interest in reactive distillation system

| Sample | Ethanol | Ethyl Butyrate | Butyric Acid |
|---|---|---|---|
| Initial Pot | 240.81 | 0.00 | 4.02 |
| Final Pot | 0.00 | 0.00 | 1.64 |
| Total Distillate | 349.31 | 1.29 | 4.82 |

As seen in FIG. 3, the ethanol and ethyl butyrate concentration curves have the same shape and are inverse of the butyric add concentration curve. During the distillation, butyric add was reacted with ethanol over the catalyst to form the desired ethyl butyrate. This product was then carried over in the distillate stream by the ethanol. Other compounds measured in the distillate as a function of volume collected include: acetone, methanol, n-propanol, n-butanol, isobutanol, isoamyl alcohol, ethyl acetate, and butyl butyrate. These are also plotted in FIG. 3. The ethyl acetate curve is relatively large in the first sample then falls to zero; this is consistent with the pattern seen in industrial beverage distillation. In this experiment, if a spirit were being created, the heads would have been cut after collecting 5 mL, and the tails would have been cut after collecting 40 mL. These cuts would have resulted in the final hearts product being 35 mL in volume and having low ethyl acetate and butyric acid concentrations.

Sensory Evaluation

Four variations of the reactive distillation described above were distilled and 35 mL of hearts were collected from each as discussed above. The collected hearts cuts of each sample were then evaluated by a panel of eight participants for their sensory properties. Table 3 shows the differences in the initial reactant mixtures of the four samples. The evaluation sheet asked what the participant could smell in each sample and also if they could tell a difference between samples.

TABLE 3

Difference in the samples used for the sensory evaluation

| Sample | Butyric Acid [g/L] | Catalyst [g] |
|---|---|---|
| 1 | 0 | 0 |
| 2 | 0 | 7.5 |
| 3 | 5 | 0 |
| 4 | 5 | 7.5 |

The evaluation showed that samples 1 and 2 were similar with a smell of whiskey and they could be told apart; sample 1 had a stronger whiskey smell than sample 2. Sample 3 had notes of licorice and popcorn, which is expected as there was butyric acid present. Sample 4 was overwhelmingly different than the others having a fruity smell similar to that of banana candy or bubble gum. Specific sensory evaluations for each participant are summarized in Tables 4 and 5.

TABLE 4

Sample notes from individual sensory evaluations

| Participant | Sample 1 | Sample 2 | Sample 3 | Sample 4 |
|---|---|---|---|---|
| 1 | whiskey | softer than 1 | N/A | juicy fruit gum |
| 2 | corn | corn | cheese | licorice/fruity |
| 3 | alcohol | alcohol | same as 2 | apples |
| 4 | corn | corn | corn | bubble gum |
| 5 | corn whiskey | corn whiskey | buttered popcorn | buttered popcorn |
| 6 | Popsicle stick | less strong, but same as 1 | olay bar soap | minty |
| 7 | whiskey | bubble yum | soap | sour candy, apple |
| 8 | plastic, organic, sweet | less sweet | N/A | popcorn |

TABLE 5

Could the participant tell a difference between samples of the sensory evaluation.

| | Sample | | | | | |
|---|---|---|---|---|---|---|
| Participant | 1v2 | 1v3 | 2v3 | 1v4 | 2v4 | 3v4 |
| 1 | yes | no | yes | yes | yes | yes |
| 2 | no | yes | yes | yes | yes | yes |
| 3 | yes | yes | no | yes | yes | yes |
| 4 | yes | yes | yes | yes | yes | yes |
| 5 | no | yes | yes | yes | yes | yes |
| 6 | yes | yes | yes | yes | yes | yes |
| 7 | yes | yes | yes | yes | yes | yes |
| 8 | yes | no | yes | yes | yes | yes |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the apparatus, compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 100 reaction system
110 reaction mixture
120 reactive distillation column
130 esterification catalyst
140 distillation product
142 distillation overhead
144 condenser
146 reflux (liquid recycle)
150 bottoms product
152 bottoms
154 reboiler
156 vapor recycle

What is claimed is:

1. A method for beverage spirit production, the method comprising:
   providing a reaction mixture comprising water, ethanol, and a carboxylic acid having 3 or more carbon atoms;
   reactively distilling the reaction mixture in the presence of an esterification catalyst to (i) react a portion of the ethanol and the carboxylic acid to form an ethyl carboxylate reaction product, and (ii) form a distillation product comprising water, ethanol, and the ethyl carboxylate;
   wherein:
   the distillation product has a water concentration less than that of the reaction mixture; and
   the distillation product has an ethanol concentration greater than that of the reaction mixture.

2. The method of claim 1, wherein the carboxylic acid has 3 to 6 carbon atoms.

3. The method of claim 1, wherein the carboxylic acid comprises an aliphatic carboxylic acid.

4. The method of claim 1, wherein the carboxylic acid is selected from the group consisting of propanoic acid, butanoic acid, pentanoic acid, hexanoic acid, citric acid, vanillic acid, and combinations thereof.

5. The method of claim 1, wherein the carboxylic acid comprises butanoic acid.

6. The method of claim 1, wherein:
   the carboxylic acid has a binary azeotrope with water;
   a ternary mixture of the carboxylic acid, water, and ethanol is characterized by a separatrix defining a co-distillation region of concentration values in which the carboxylic acid is preferentially distilled with ethanol; and
   the reaction mixture has concentration values for water, ethanol, and the carboxylic acid which are in the co-distillation region.

7. The method of claim 6, wherein the carboxylic acid has a boiling point above that of water.

8. The method of claim 1, wherein the reaction mixture comprises a low wine spirit.

9. The method of claim 1, wherein the reaction mixture has an initial concentration for the carboxylic acid in a range from 0.001 wt. % to 2 wt. %.

10. The method of claim 1, wherein the distillation product has a concentration for the ethyl carboxylate up to 2 wt. %.

11. The method of claim 1, wherein the reaction mixture has an initial concentration for ethanol in a range from 10 wt. % to 40 wt. %.

12. The method of claim 1, wherein the reaction mixture comprises one or more byproducts selected from the group consisting of acetone, acetic acid, methanol, n-propanol, n-butanol, isoamyl alcohol, and combinations thereof.

13. The method of claim 1, wherein the esterification catalyst comprises a solid acid catalyst.

14. The method of claim 1, further comprising:
co-fermenting ethanol and the carboxylic acid in a grain mixture to form a fermented grain mixture comprising ethanol and the carboxylic acid; and
performing one or more separation processes on fermented grain mixture to form the reaction mixture.

15. The method of claim 14, wherein the grain mixture comprises *Clostridium tyrobutyricum* as a fermentation microorganism producing butyric acid as the carboxylic acid having 3 or more carbon atoms.

16. The method of claim 1, wherein the reactive distillation product is or is a component of a beverage spirit selected from the group consisting of vodka, gin, rum, brandy, and whisky.

* * * * *